US011159323B1

(12) United States Patent
Barraza Enciso et al.

(10) Patent No.: US 11,159,323 B1
(45) Date of Patent: Oct. 26, 2021

(54) PSEUDONYMOUS VIDEO DATA CAPTURE AND QUERY SYSTEM

(71) Applicant: Bank of America Corporation, Charlotte, NC (US)

(72) Inventors: Maria Carolina Barraza Enciso, New York, NY (US); Elena Kvochko, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 196 days.

(21) Appl. No.: 16/416,449

(22) Filed: May 20, 2019

(51) Int. Cl.
*H04L 9/32* (2006.01)
*H04L 29/06* (2006.01)

(52) U.S. Cl.
CPC .......... *H04L 9/3218* (2013.01); *H04L 63/123* (2013.01); *H04L 63/126* (2013.01)

(58) Field of Classification Search
CPC ... H04L 9/3218; H04L 63/126; H04L 63/123; H04L 9/32; H04L 63/12; H04L 29/06
See application file for complete search history.

(56) References Cited

U.S. PATENT DOCUMENTS

| | | | |
|---|---|---|---|
| 6,529,234 B2 | 3/2003 | Urisaka et al. | |
| 7,933,989 B1 | 4/2011 | Barker et al. | |
| 9,293,016 B2 | 3/2016 | Friedman | |
| 9,916,493 B2 | 3/2018 | Begeja et al. | |
| 9,922,514 B2 | 3/2018 | Gagvani et al. | |
| 9,997,056 B2 | 6/2018 | Bleisch | |
| 10,044,990 B2 | 8/2018 | Mahar et al. | |
| 10,073,929 B2 | 9/2018 | Vaynriber et al. | |
| 10,088,841 B2 | 10/2018 | Kerzner | |
| 10,157,537 B1 | 12/2018 | Coxwell | |
| 10,205,913 B2 | 2/2019 | Smith et al. | |
| 10,580,272 B1 | 3/2020 | Edwards et al. | |
| 2010/0115282 A1 | 5/2010 | Amsterdam et al. | |
| 2012/0075465 A1 | 3/2012 | Wengrovitz et al. | |
| 2012/0317507 A1 | 12/2012 | Gutierrez et al. | |
| 2013/0024788 A1 | 1/2013 | Olsen et al. | |

(Continued)

OTHER PUBLICATIONS

"Health Insurance Portability and Accountability Act of 1996," https://www.govinfo.gov/content/pkg/PLAW-104publ191/pdf/PLAW-104publ191.pdf, Aug. 21, 1996.

(Continued)

*Primary Examiner* — Quazi Farooqui
(74) *Attorney, Agent, or Firm* — Weiss & Arons LLP; Michael A. Springs, Esq.

(57) ABSTRACT

A method for capturing and querying pseudonymous video data is provided. The method may include capturing a video using one or more video cameras. The method may include transmitting the captured video, via a video transformation encryption module. The video transformation encryption module may transform the captured video into an encrypted documentation file. The method may include receiving and storing the captured video as an encrypted documentation file in a storage location. The method may include receiving a binary query from a first user. The query may relate to the captured video. The method may include using an executable file to peruse the encrypted documentation file to determine a binary response to the binary query. The method may include transmitting the binary response to the first user.

9 Claims, 4 Drawing Sheets

(56) References Cited

U.S. PATENT DOCUMENTS

| | | | |
|---|---|---|---|
| 2013/0227594 A1 | 8/2013 | Boone et al. | |
| 2015/0006580 A1* | 1/2015 | Iakovlev | G06F 21/6281 |
| | | | 707/783 |
| 2015/0121082 A1 | 4/2015 | Carapelli et al. | |
| 2016/0026875 A1 | 1/2016 | Matsumoto et al. | |
| 2016/0156823 A1 | 6/2016 | Yoshida et al. | |
| 2017/0048245 A1 | 2/2017 | Owen et al. | |
| 2017/0076572 A1 | 3/2017 | Rao | |
| 2017/0124348 A1* | 5/2017 | Pourzandi | H04L 9/008 |
| 2018/0143430 A1* | 5/2018 | Koppal | G02B 27/0172 |
| 2019/0042851 A1 | 2/2019 | Varadarajan et al. | |
| 2019/0236342 A1 | 8/2019 | Madden et al. | |
| 2019/0268537 A1 | 8/2019 | Jang | |
| 2019/0297131 A1 | 9/2019 | Orsini | |
| 2019/0304506 A1 | 10/2019 | Michaud et al. | |
| 2019/0377901 A1 | 12/2019 | Balzer et al. | |
| 2020/0211099 A1* | 7/2020 | Smith | H04L 9/3073 |

OTHER PUBLICATIONS

"Fair Credit Reporting Act," https://www.consumer.ftc.gov/articles/pdf-0111-fair-credit-reporting-act.pdf, Sep. 2012.
"Summary of the HIPAA Privacy Rule," https://www.hhs.gov/hipaa/for-professionals/privacy/laws-regulations/index.html, Office for Civil Rights, Jul. 26, 2013.
Berliri et al., "Part 3: The Concept of Personal Data Revisited," https://www.hldataprotection.com/2015/06/articles/international-eu-privacy/part-3-the-concept-of-personal-data-revisited/, Hogan Lovells US LLP and Hogan Lovells International LLP, Jun. 18, 2015.
Gabe Maldoff, "Top 10 Operational Impacts of the GDPR: Part 8—Pseudonymization," https://iapp.org/news/a/top-10-operational-impacts-of-the-gdpr-part-8-pseudonymization/, International Association of Privacy Professionals, Feb. 12, 2016.
"Regulation (EU) 2016/679 of the European Parliament and of the Council of Apr. 27, 2016," https://publications.europa.eu/en/publication-detail/-/publication/3e485e15-11bd-11e6-ba9a-01aa71al/language-en, Official Journal of the European Union, Apr. 27, 2016.
"GDPR Recitals and Articles, Chapter I General Provisions," https://gdpr-info.eu/art-1-gdpr/, Apr. 27, 2016.
"Police Body Worn Cameras: A Policy Scorecard," https://www.bwcscorecard.org/, The Leadership Conference on Civil and Human Rights and Upturn, Nov. 2017.
Allie Shaw, "Do You Need a DVR?" https://www.reviews.org/tv-service/do-you-need-a-dvr/, Aug. 16, 2018.
"Electronic Communications Privacy Act," https://enwikipedia.org/wiki/Electronic_Communications_Privacy_Act, Wikimedia Foundation, Inc., Mar. 14, 2019.
Amazon.com: Zmodo Wireless Security Camera System (4 Pack), https://www.amazon.com/Zmodo-Wireless-Security-Outdoor-Recording/dp/B017SDSRWO?psc=1&SubscriptionId=AKIAINYWQL7SPW7D7JCA&tag=aboutcom02thebalance-20&linkCode=sp1&camp=2025&creative=165953&creatveASIN=B017SD8RWO Retrieved on Mar. 22, 2019.
Amazon.com: ZOSI 1080P HD-TVI Security Camera System, https://www.amazon.com/ZOSI-Security-Recorder-1920TVL-Weatherproof/dp/B010EUJGBY?psc=1&SubscriptionId=AKIAINYWQL7SPW7D7JCA&tag=aboutcom02thebalance-20&linkCode=sp1&camp=2025&creative=165953&creatveASIN=B010EUJGBY Retrieved on Mar. 22, 2019.
"Fourth Amendment: An Overview," https://www.law.cornell.edu/wex/fourth_amendment, Cornell Law School, Retrieved on Apr. 11, 2019.
"IAB: California Consumer Privacy Act (CCPA) & Digital Advertising Webinar," https://www.iab.com/wp-content/uploads/2018/11/2018-11-15-IAB-CCPA-and-Digital-Advertising.pdf, Retrieved on Apr. 11, 2019.
"IAB: California Consumer Privacy Act," https://www.iab.com/ccpa/, Retrieved on Apr. 11, 219.
"California Consumer Privacy Act," https://en.wikipedia.org/wiki/California_Consumer_Privacy_Act, Wikimedia Foundation, Inc., Apr. 19, 2019.
Juliana D. Groot, "What is the General Data Protection Regulation? Understanding & Complying with GDPR Requirements in 2019," https://digitalguardian.com/blog/what-gdpr-general-data-protection-regulation-understanding-and-complying-gdpr-data-protection, Digital Guardian, Apr. 26, 2019.
"Electronic Code of Federal Regulations," https://www.ecfr.gov/cgi-bin/text-idx?SID-6bcd30cc5odclfc5e2dc19d3728b016b&mc=true&tpl=/ecfrbrowse/Title16/16CIsub.chapf.tpl, Apr. 29, 2019.
"Advanced Smart Playback," Retrieved on Apr. 30, 2019.
Gentry et al., "Using Fully Homomorphic Hybrid Encryption to Minimize Non-interactive Zero-Knowledge Proofs," https://web.eecs.umich.edu/~cpeikert/pubs/FHENIZK.pdf. Retrieved on Apr. 30, 2019.
"Amendments to the Constitution of the United States of America," https://www.govinfo.gov/content/pka/GPO-CONAN-1992/pdf/GPO-CONAN-1992-7.pdf, Retrieved on May 1, 2019.
Cyrus Farivar and David Ingram, "California is Bringing Law and Order to Big Data. It Could Change the Internet in the U.S." https://newsflash.one/2019/05/13/california-is-bringing-law-and-order-to-big-data-it-could-change-the-interet-in-the-u-s/, May 13, 2019.
Cyrus Farivar and David Ingram, "California's New Data Privacy Law Could Change the Internet in the US," https://www.cnbc.com/2019/05/14/califoria-consumer-privacy-act-could-change-the-internet-in-the-us.html. Retrieved on May 14, 2019.

* cited by examiner

PSEUDONYMOUS VIDEO DATA CAPTURE AND QUERY SYSTEM

FIELD OF TECHNOLOGY

This disclosure relates to a video data capture system.

BACKGROUND

Recently, governments have enacted more stringent privacy regulations. The regulations include, for example, the General Data Protection Regulation ("GDPR"), the Health Insurance Portability and Accountability Act ("HIPAA"), the Fair Credit Reporting Act ("FCRA"), the Electronic Communications Privacy Act ("ECPA") and the California Consumer Privacy Act.

The GDPR is a regulation of the council of the European Union on the protection of natural persons with regard to the processing of personal data and the free movement of the data. (See GDPR)

The HIPAA act states that each person . . . who maintains or transmits health insurance shall maintain reasonable and appropriate administrative, technical, and physical safeguards to ensure the integrity and confidentiality of the information. The HIPAA act further states that the safeguards should protect against any reasonably anticipated threats or hazards to the security or integrity of the information and unauthorized uses or disclosures of the information. (See HIPAA)

The FCRA allows consumers the opportunity to prohibit all solicitations referred to in such paragraph, and may allow the consumer to choose from different options when electing to prohibit the sending of such solicitations, including options regarding the types of entities and information covered, and which methods of delivering solicitations the consumer elects to prohibit. (See FCRA)

The ECPA protects wire, oral, and electronic communications while those communications are being made, are in transit, and when they are stored on computers. The act applies to email, telephone conversations and data stored electronically. (See ECPA)

The California Consumer Privacy Act grants a consumer a right to request a business to disclose the categories and specific pieces of personal information that it collects about the consumer. The act also grants a consumer a right to the request a business to disclose the categories of sources from which that information is collected. The act also grants a consumer a right to request a business to disclose the business purposes for collecting or selling the information and the categories of third parties with which the information is shared. (See California Consumer Privacy Act)

In addition to recently enacted regulations, the Fourth Amendment to the United States Constitution, protects a person against unreasonable searches and seizures. The Fourth Amendment to the United States Constitution states "The right of people to be secure in their persons, houses, papers, and effects, against unreasonable searches and seizures, shall not be violated, and no Warrants shall issue, but upon probably cause, supported by Oath or affirmation, and particularly describing the place to be searched, and the persons or things to be seized." Fourth Amendment to the United States Constitution.

In addition to these regulations, customer expectations of privacy have risen. These expectations include proper security measures to be placed on personal data as well as other privacy regulations. Specifically, there have been increased expectations of privacy from the regulations and from consumers relating to video recording and the storage thereof.

Examples of video recording privacy regulations include the GDPR's requirement for consent to collect personal, biometric, identifiable, and/or personally identifiable information about a person. The GDPR states that the request for consent must be given in an intelligible and easily accessible form, together with an explanation of the purpose for data processing attached to that consent. The GDPR also states that consent must be clear and distinguishable from other matters and provided in an intelligible and easily accessible form, using clear and plain language. The GDPR further states that it must be as easy to withdraw consent as it is to give it.

Current video technology captures everything in viewing range and does not enable removal of a single person from a video footage segment. Therefore, in order to delete a person from a video footage segment, as may be requested by a person who was videoed, deletion of the entire video segment, that includes the requestor, is currently required using the existing video technology.

Additionally, the GDPR states further that the controller shall provide, to a videoed requestor, a copy of the personal data, free of charge, in an electronic format. This rule, as well as the others set forth, represents a dramatic shift to data transparency and empowerment of data subjects.

Although these regulations preserve the privacy of individuals, these regulations disadvantage organizations with respect to security. Many organizations employ security cameras and other video mechanisms in order to effectively secure the organization's physical locations. It should be appreciated that organization physical locations and cyber locations are merging. As such, cameras and video mechanisms are necessary for securing organizations holistically.

These regulations require the organizations to obtain consent from individuals prior to videoing the individuals. The required consent may be physical consent, written consent, digital consent, explicit consent and/or other suitable consent mechanism. Different regulations may require different forms of consent. Additionally, these regulations require an organization to delete video footage that includes a specific individual upon request by the individual. It may be difficult to delete a specific individual from video footage without deleting the entire footage segment. Deleting entire footage segments may compromise the security of an organization.

As a result, organizations have been struggling in an attempt to maintain organization security while adhering to government regulations and consumer expectations. Therefore, privacy-enabled video verification cameras would be desirable. Privacy-enabled video verification cameras may capture all footage in a desired range and store the footage in a pseudonymous manner. The pseudonymous manner may enable data regarding the video to be stored. However, the video may be unable to be reconstructed, thereby enabling the organizations to adhere to the regulations.

SUMMARY OF THE DISCLOSURE

A method for capturing and querying pseudonymous video data is provided. The process for pseudonymization will be discussed in more detail below. The method may include capturing a video using one or more video cameras. The method may include transforming the captured video into an encrypted documentation file. The encrypted documentation file may be insufficient to reconstruct the captured video.

The method may include storing the encrypted documentation file in a storage location. The method may include receiving a binary query from a first user. The query may relate to the captured video.

A binary query may be a query in which there are only two possible results. One example of such a query may be known colloquially as a yes or no question.

The method may include using an executable file to peruse the encrypted documentation file in order to determine a binary response to the binary query. The method may include transmitting the binary query to the first user.

The executable file may utilize zero-knowledge technology to determine the binary response. The executable file may utilize other suitable technology to determine the binary response.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
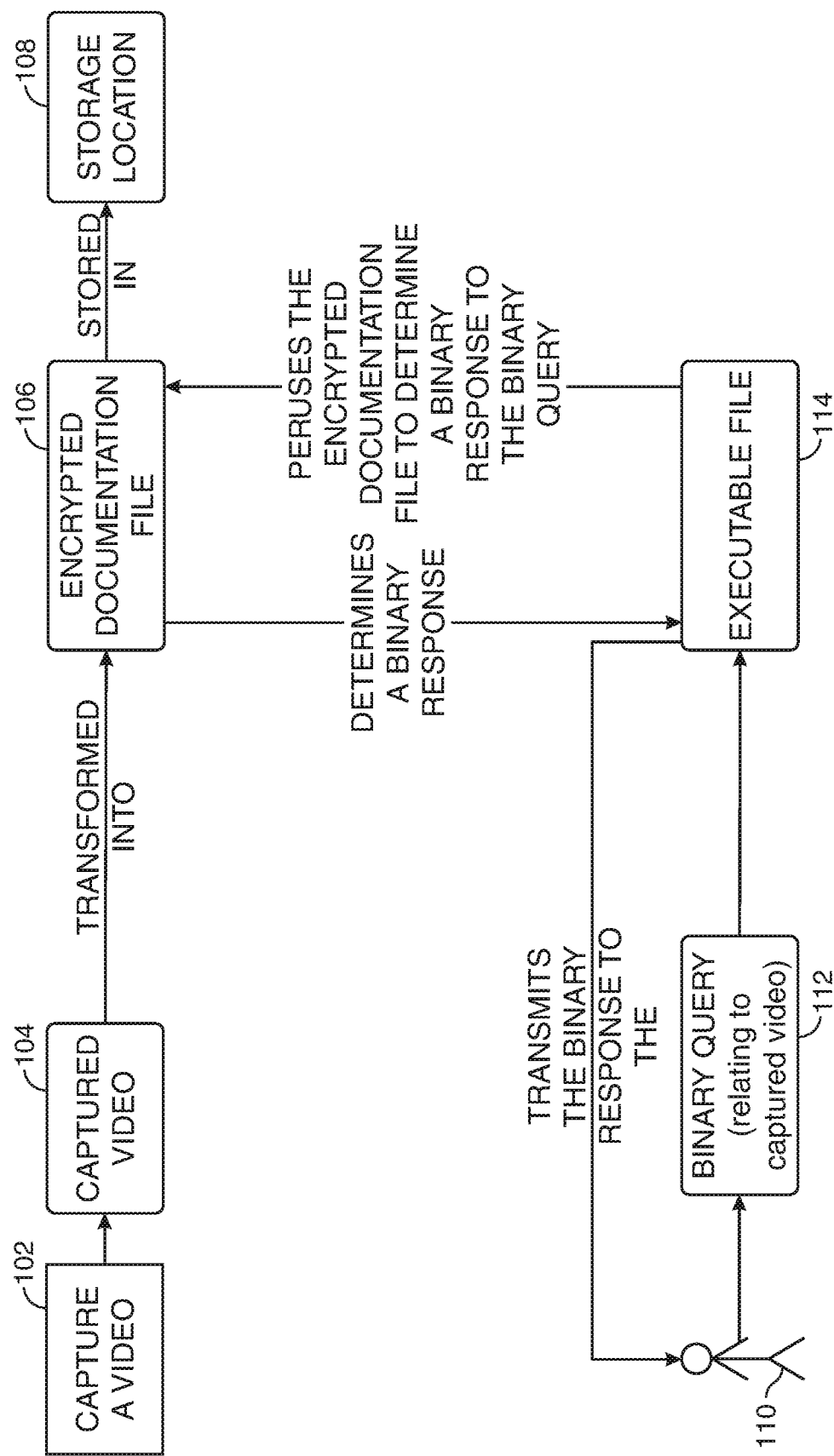
FIG. 1 shows an illustrative flow chart in accordance with principles of the invention.

In order to comply with various privacy regulations while maintaining the security of organization locations, organizations may utilize privacy-enabled security cameras. Privacy-enabled security cameras may pseudonymize the recorded video footage in order to protect the privacy of personal data recorded in the footage. The process for pseudonymization will be discussed in more detail below.

In order to maintain location security, while preserving individual rights to his or her respective persona, a privacy-enabled video footage system may be provided. The system may provide heightened privacy to videoed individuals while maintaining a location's security. The privacy-enabled video footage system may include verification capabilities. The capabilities may include a face deletion module. The face deletion module may detect a face while capturing a video. The face deletion module may blur the face to protect the privacy of the videoed individual. The blurred face and/or key features of the blurred face may be stored in an encrypted database. In some embodiments, the key features may be stored even though the video has been deleted. Examples of key features may include eye color, hair color, eye dimensions and mouth dimensions.

In some embodiments, the raw video footage may be retained for a predetermined period of time prior to being transformed into encrypted documentation. One exemplary time frame of raw video retention may be 72 hours.

A homomorphic encryption module may be used to encrypt the data and/or faces to be stored in the encrypted database. Homomorphic encryption may be a one-way function to encrypt. Data encrypted by a homomorphic encryption module may be encrypted and may not be able to be decrypted. It should be appreciated that any suitable technology for removing identification and/or other suitable methods for removing facial identification may be used.

The verification capabilities may also include a facial validation module. The facial validation module may verify whether a specific individual is or is not present in a video. The facial validation module may receive a photograph and/or video of a specific face. The specific face may be of interest to an organization. The specific face may be of interest to a law enforcement organization. The facial validation module may verify whether the received face matches a fully encrypted face stored in the encrypted database. When it is determined that the received face matches an encrypted face included in the encrypted database over a predetermined threshold, it may be verifiable that the specific face was present at an identified location at an identified time. It should be appreciated that the verification, blurring or any other suitable action, may be executed independent of any human watching stored video footage.

Additionally, in some embodiments, an artificial intelligence/machine learning system may be running in the background. The artificial intelligence/machine learning system may learn identification keys, such as what features are most important, in order to identify a person. The system may also learn which people are more likely to be of malicious intent based on the time of day that they arrive, or any other suitable information.

The GDPR defines the term pseudonymization to mean processing of personal data in a manner that the data can no longer be attributed to a specific data subject without the use of additional information. In order to pseudonymize a data set, the additional information should be stored separately from the data. Furthermore, the additional information should be subject to technical and organizational measures to ensure non-attribution to an identified or identifiable person. This privacy-enhancing technique separates data from direct identifiers so that linkage to an entity is not possible absent additional information that is held separately.

It should be appreciated that the system may pseudonymize a data element to a greater extent than the extent required by the GDPR. The video may be encrypted and may be unable to be decrypted. The key features may be stored separately. In some embodiments, an external party may store the key features and perform the verification.

In some embodiments, the stored encrypted video footage may be understood to be data that can no longer be attributed to a specific data subject absent the use of additional information. The additional information may be understood to be the photograph or video received.

In other embodiments, the additional information may be a request for information. An example of such a request may be: Did a mailman bring mail to office number 2109 between the hours of 1:00 PM and 3:00 PM on 1/2/2001? The system may peruse the stored encrypted video to determine a response to the request. Although the video may be encrypted, the system may be able to determine responses to requests or queries based on the encrypted video. However, a human may preferably not be able to view the video or otherwise determine the contents of the video file. In the event that law enforcement officials require the encrypted contents of the video documentation, the documentation may be presented to the officials within a reasonable framework.

A system for responding to queries of pseudonymous video data is provided. The system may include a video camera. The video camera may be operable to capture a video. The video camera may be a security camera.

The security cameras may include various features, such as internet connection, WiFi connection, global positioning system ("GPS") sensors and cloud storage. Security cameras may be compatible with internet of things ("IoT") devices and/or mobile devices. Security cameras may also include features such as encrypted video, privacy mode, walkie-talkie mode, cellular connection and satellite connection for remote location compatibility. Security cameras may also include near field communication ("NFC") communication and contactless communication capabilities. Security cameras may also include special intelligence to reduce the occurrence of false alerts. Security cameras may also include voice and vibration triggers and facial recognition technology. The facial recognition technology may generate an alert in response to detection of an unknown face.

Security cameras may provide live feeds to smartphones, tablets and/or computers. Security cameras may include night vision features that may enable the camera to video during nighttime. Security cameras may be compatible with digital video recorders ("DVR") and universal serial bus ("USB") drives. Security cameras may be waterproof. Security cameras may include physical closable shutters over the camera.

Security cameras may include motion triggers and motion tracking. The motion triggers may be based on what the camera is viewing. There may be motion triggered notifications sent to mobile phones via an application. The motion tracking may zoom in and follow motion.

Security cameras may include a manually-activated, integrated alarm. An application linked to the security cameras may provide speed dial emergency services. Security cameras may also include air quality sensors and humidity sensors.

Security cameras may be wearable on a body. Body-wearable security cameras may include global positioning software ("GPS") coordinate detectors.

The system may include a transmitter. The transmitter may be linked to the video camera. The transmitter may be operable to transmit the video to a transformation module. The system may include the transformation module. The transformation module may be operable to transform the video into an encrypted documentation file. The encrypted documentation file may be insufficient to reconstruct the video.

The system may include an electronic storage medium. The electronic storage medium may be operable to store the encrypted documentation file.

The system may include a receiver. The receiver may be operable to receive a binary query. The binary query may relate to a video.

The system may include an executable file. The executable file may be operable to peruse the encrypted documentation file to determine a binary response to the binary query. The executable file may utilize zero-knowledge technology to determine the binary response. Zero-knowledge technology may utilize non-interactive zero-knowledge proofs. Non-interactive zero-knowledge proofs may be used to demonstrate the truth of a statement without revealing anything else.

The system may include a display module. The display module may be operable to display the binary response.

In some embodiments, there may be a plurality of electronic storage mediums. The encrypted documentation file may be stored on a first electronic storage medium. The captured video may be stored on a second electronic storage medium.

A plurality of users may present queries to the system. Some users may qualify for critical access. Critical access may be understood to mean access to the captured video. The system may peruse the captured video and/or the encrypted documentation file in response to a request from a user that qualifies for critical access.

Some users may qualify for regular access. Regular access may be understood to mean access to the encrypted documentation file. A user qualifying for regular access may be prevented from accessing the captured video. The system may peruse the encrypted documentation file in response to a request from a user that qualifies for regular access.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative flow chart. Step 102 shows capturing a video. Captured video 104 may be transformed into encrypted documentation file 106. The transformation may include identifying and retrieving the faces from the video. The transformation may also include retrieving key features from the video. The transformation may include encrypting the faces and/or key features. The transformation may also include encrypting the video footage separately from the faces and key features. Encrypted documentation file 106 may include the encrypted faces, encrypted key features and the encrypted video footage. Encrypted documentation file 106 may be stored in storage location 108.

User 110 may submit binary query 112. Binary query 112 may be related to captured video 104. Binary query 112 may be transmitted to executable file 114. Executable file 114 may communicate with encrypted documentation file 106 stored in storage location 108. The communication may include a request to peruse the encrypted documentation file in order to determine a binary response to the binary query.

Executable file 114 may determine a binary response to the binary query. Executable file 114 may transmit the binary response to user 110.

In an exemplary embodiment, a security camera located at establishment ABC may be continuously videoing the ABC jewelry department. The captured video footage may be encrypted and then stored in a storage location.

At some time, a person of malicious intent may take jewelry from establishment ABC without providing appropriate payment. In order to identify the person of malicious intent, ABC jewelry department personnel may recall personal details relating to the person of malicious intent. In some embodiments, security personnel may query the encrypted captured video footage, using the personal details, to determine various particulars relating to the person of malicious intent. Exemplary queries may include whether the person was wearing a hat, if the person was present in establishment ABC in a specified time frame, whether the person left through a specific door and/or other similar queries.

Additionally, if there is a known suspect, security personnel may upload a photograph or video of the suspect. Upon receipt of the photograph or video, the system may determine, using facial recognition technology and artificial intelligence/machine learning technology data analytics technology, whether the uploaded photograph or video corresponds, over a predetermined degree of correspondence, to the individual shown in the encrypted documentation file.

Figure 2:
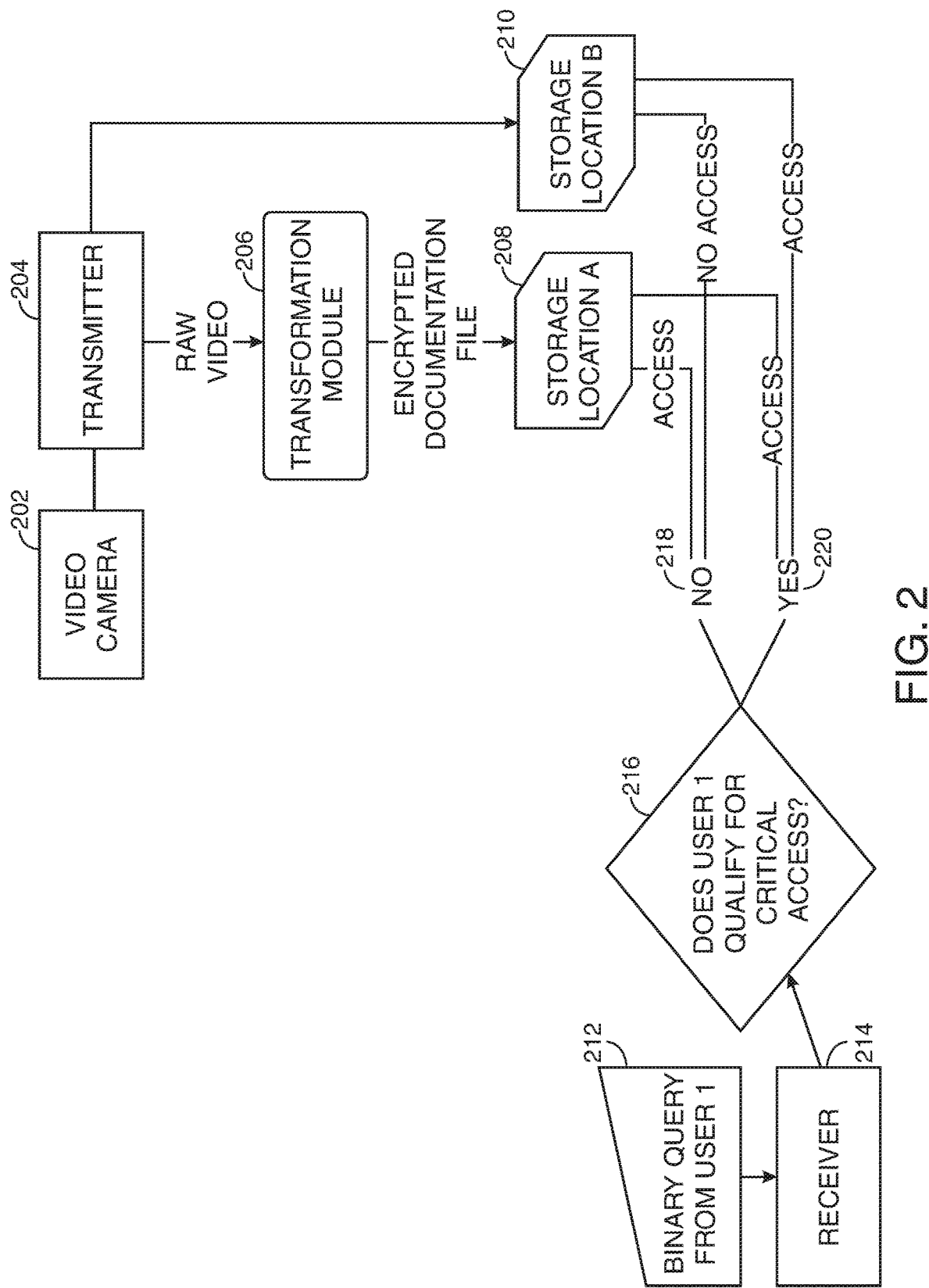
FIG. 2 shows another illustrative flow chart in accordance with principles of the invention.

FIG. 2 shown another illustrative flow chart. Video camera 202 may be associated with transmitter 204. Video camera 202 may be continuously, or periodically, recording video footage. Raw video footage may be transmitted, via transmitter 204, to transformation module 206 and storage location B, shown at 210. Storage location B may be a high security storage location.

Transformation module 206 may encrypt the raw video. The resulting file may be an encrypted documentation file. The encrypted documentation file may be stored in storage location A, shown at 208. It should be appreciated that the security required for storage location B may be greater than the security required for storage location A, because storage location B includes more sensitive data—i.e., the raw video files.

Binary query 212 may be received at receiver 214 from user 1. The system may determine whether user 1 qualifies for critical access, as shown at step 216. Critical access may be defined as access to raw video data. Qualifications may be determined based on the user's entitlements and/or other information. In some embodiments, user qualifications may be included in the binary query.

If user 1 qualifies for critical access, the system may query both storage location A and storage location B, as shown at 220. If user 1 does not qualify for critical access, the system may query storage location A, as shown at 218.

Figure 3:
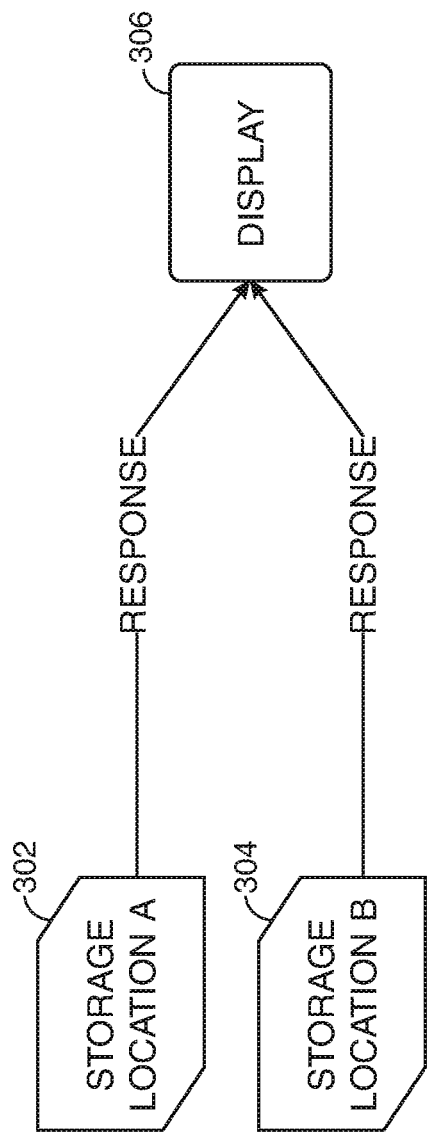
FIG. 3 shows yet another illustrative flow chart in accordance with principles of the invention.

FIG. 3 shows an exemplary flow chart. Upon the determination that a response to a user's query is found in storage location A, the response may be transmitted to display 306. The response may be displayed on display 306.

Upon determination that a response to a user's query is found in storage location B, the response may be transmitted to display 306. The response may be displayed on display 306.

In some embodiments, the response from storage location A and the response from storage location B may be displayed together on display 306. Display 306 may show a difference between responses received from storage location A and responses received from storage location B.

Figure 4:
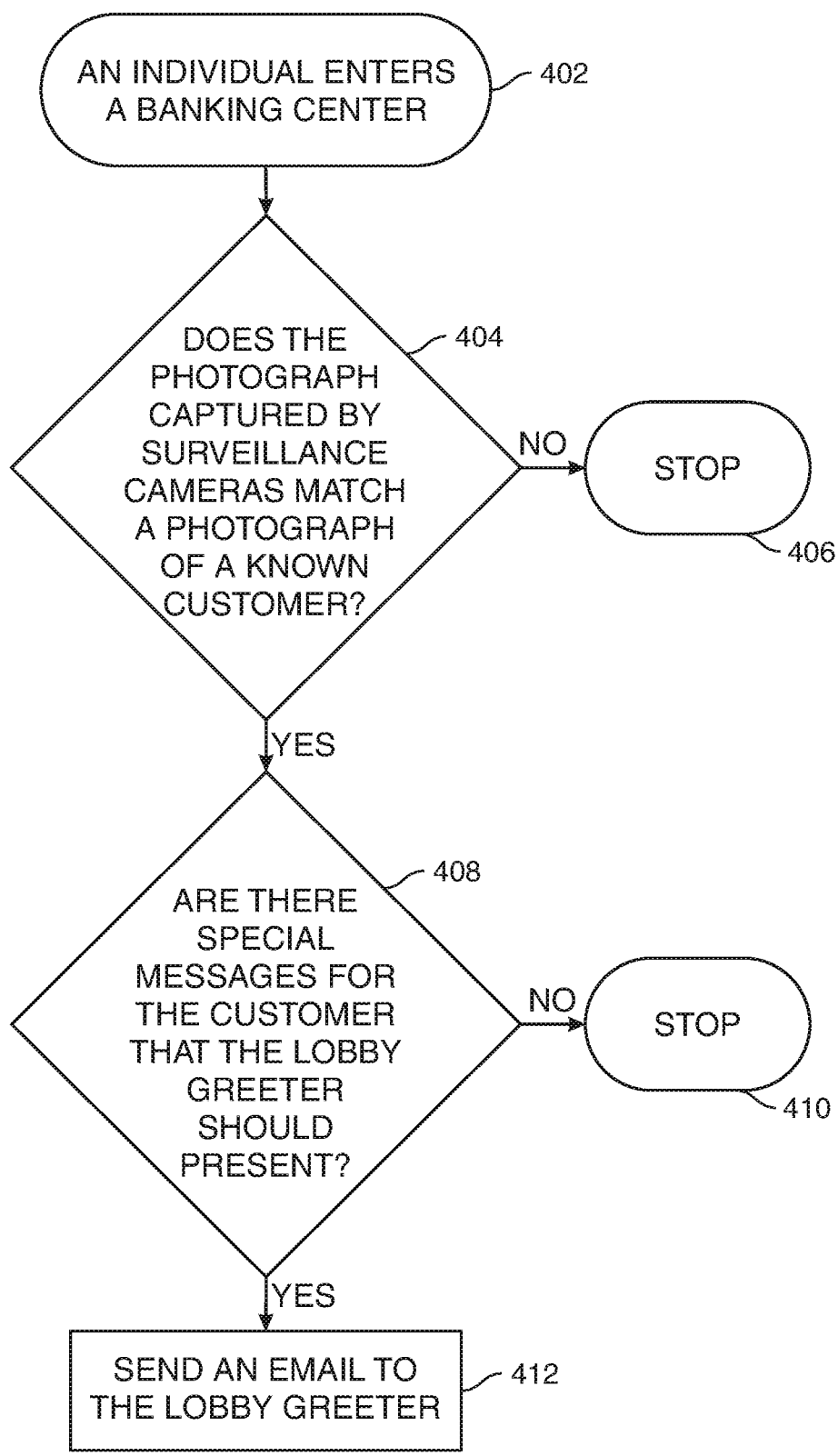
FIG. 4 shows still another illustrative flow chart in accordance with principles of the invention.

FIG. 4 shows an illustrative flow chart. FIG. 4 shows an embodiment of the disclosure. Step 402 shows an individual entering a banking center. Step 404 shows a system determining whether the photograph captured by the surveillance cameras matches a photograph of a known customer.

If the captured photograph does not match the photograph of a known customer, the process may stop, as shown at 406.

If the captured photograph does match the photograph of a known customer, the system may determine whether there are special messages for the customer that the lobby greeter should present. If the system determines that there are no special messages for the customer, the process may stop, as shown at step 410.

If the system determines that there are special messages for the customer, the system may send an email to the lobby greeter, as shown at step 412. The email may include the special messages to be presented to the customer. The email may also include a description of the customer. The email may also include a photograph of the customer.

Thus, a system for capturing and querying pseudonymous video data is provided. Persons skilled in the art will appreciate that the present invention can be practiced by other than the described embodiments, which are presented for purposes of illustration rather than of limitation. The present invention is limited only by the claims that follow.

What is claimed is:

1. A method for capturing and querying pseudonymous video data, the method comprising:
   capturing a video using one or more video cameras;
   storing the captured video in a first storage location;
   transforming the captured video into an encrypted documentation file, said encrypted documentation file being insufficient to reconstruct the captured video;
   storing the encrypted documentation file in a second storage location, said first storage location and said second storage location being different physical storage locations;
   receiving a first query from a first user, said first query relating to the captured video, said first user qualifying for critical access, said critical access comprising access to the captured video;
   using an executable file to peruse both the captured video stored on the first storage location and the encrypted documentation file at the second storage location to determine a response to the first query;
   transmitting the response to the first query to the first user;
   receiving a second query from a second user, said second query being a binary query comprising at least one data element, said second user qualifying for regular access, said regular access comprising access to the encrypted documentation file;
   using the executable file to peruse the encrypted documentation file to determine a binary response to the second query, the perusing using the at least one data element included in the binary query, while preventing the second user from accessing both the captured video and the second storage location; and
   transmitting the binary response to the second query to the second user.

2. The method of claim 1, wherein the executable file utilizes zero-knowledge technology to determine the binary response, wherein zero-knowledge technology is used to demonstrate the truth of a statement without revealing anything else.

3. The method of claim 1, wherein:
   the executable file does not use zero-knowledge technology to determine the binary response; and
   the transformation includes a homomorphic encryption of the captured video.

4. A method for capturing and querying pseudonymous video data, the method comprising:
   capturing a video using one or more video cameras;
   storing the captured video in a first storage location;

transforming the captured video into an encrypted documentation file, said encrypted documentation file being unable to reconstruct the captured video;

storing the encrypted documentation file in a second storage location, said first storage location and said second storage location being different physical storage locations;

receiving a first query from a first user, said first query relating to the captured video, said first user qualifying for critical access, said critical access comprising access to the captured video;

using an executable file to peruse both the captured video stored on the first storage location and the encrypted documentation file at the second storage location to determine a response to the first query;

transmitting the response to the first query to the first user;

receiving a second query from a second user, said second query being a binary query comprising at least one data element, said second user qualifying for regular access, said regular access comprising access to the encrypted documentation file;

using the executable file to peruse the encrypted documentation file to determine a binary response to the second query, the perusing using the at least one data element included in the binary query, while preventing the second user from accessing both the captured video and the second storage location; and transmitting the binary response to the second query to the second user.

5. The method of claim 4, wherein the executable file utilizes zero-knowledge technology to determine the binary response, said zero-knowledge technology being used to demonstrate the truth of a statement without revealing anything else.

6. A method for capturing and querying pseudonymous video data, the method comprising:

capturing a video using one or more video cameras;

storing the captured video in a first storage location;

transmitting the captured video, via a video transformation encryption module, said video transformation encryption module transforming the captured video into an encrypted documentation file;

receiving and storing the captured video as an encrypted documentation file in a second storage location, said first storage location and said second storage location being different physical storage locations;

receiving a first query from a first user, said first query relating to the captured video, said first user qualifying for critical access, said critical access comprising access to the captured video;

using an executable file to peruse both the captured video stored on the first storage location and the encrypted documentation file at the second storage location to determine a response to the first query;

transmitting the response to the first user;

receiving a second query from a second user, said second query being a binary query comprising at least one data element, said second user qualifying for regular access, said regular access comprising access to the encrypted documentation file;

using the executable file to peruse the encrypted documentation file to determine a binary response to the second query, the perusing using the at least one data element included in the binary query, while preventing the second user from accessing both the captured video and the second storage location; and transmitting the binary response to the second query to the second user.

7. The method of claim 6, wherein the executable file utilizes zero-knowledge technology to determine the binary response, said zero-knowledge technology being used to demonstrate the truth of a statement without revealing anything else.

8. A system for responding to queries of pseudonymous video data, the system comprising:

a video camera, said video camera operable to capture a video;

a transmitter, said transmitter being linked to the video camera, said transmitter operable to transmit the video to both a first electronic non-transitory storage medium and a transformation module;

the first electronic storage medium, said first electronic storage medium operable to store the captured video, said first electronic storage medium being accessible to users with critical access and preventing accessibility to users with regular access;

the transformation module, said transformation module operable to transform the video into an encrypted documentation file, said encrypted documentation file being insufficient to reconstruct the video;

a second electronic non-transitory storage medium, said second electronic storage medium operable to store the encrypted documentation file, said second electronic storage medium being accessible to both users with critical access and regular access;

a receiver operable to receive:

a first query from a user with critical access, said first query relating to the video;

a second query from a user with regular access, said second query being a binary query, said second query comprising at least one data element, said second query relating to the video;

an executable file operable to:

peruse the captured video at the first electronic storage medium to determine a first response to the first query; and peruse the encrypted documentation file at the second electronic storage medium, using the at least one data element, to determine a second response to the second query; and a display module operable to:

display the first response to the user with critical access; and display the second response to the user with regular access.

9. The system of claim 8, wherein the executable file utilizes zero-knowledge technology to determine the binary response, wherein zero-knowledge technology is used to demonstrate the truth of a statement without revealing anything else.

* * * * *